Nov. 4, 1958
J. M. BEAUFORT ET AL
2,859,045
VEHICLE SUSPENSION LOCK
Filed Dec. 28, 1956
3 Sheets-Sheet 1
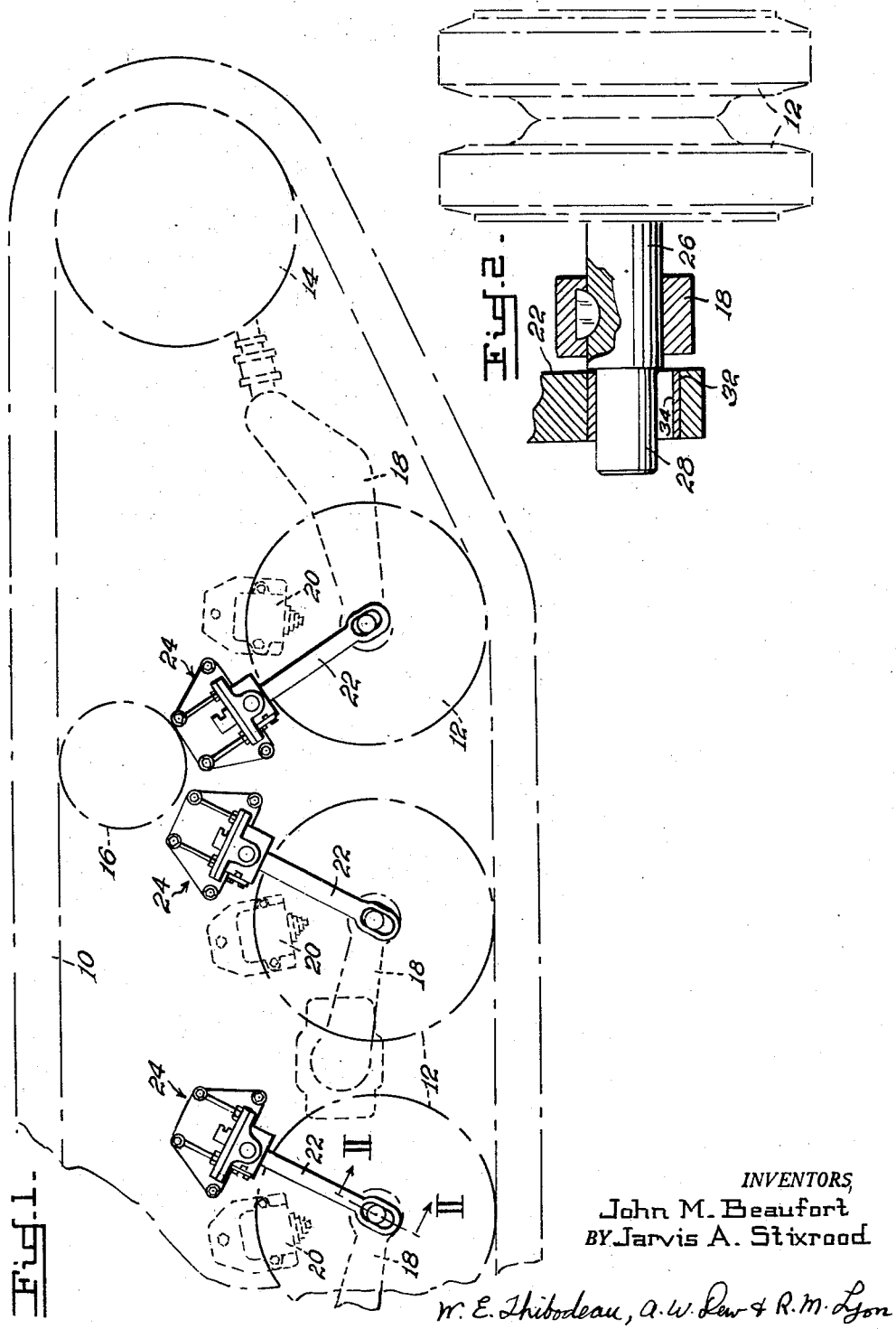
INVENTORS,
John M. Beaufort
BY Jarvis A. Stixrood
W. E. Thibodeau, A. W. Rew & R. M. Lyon

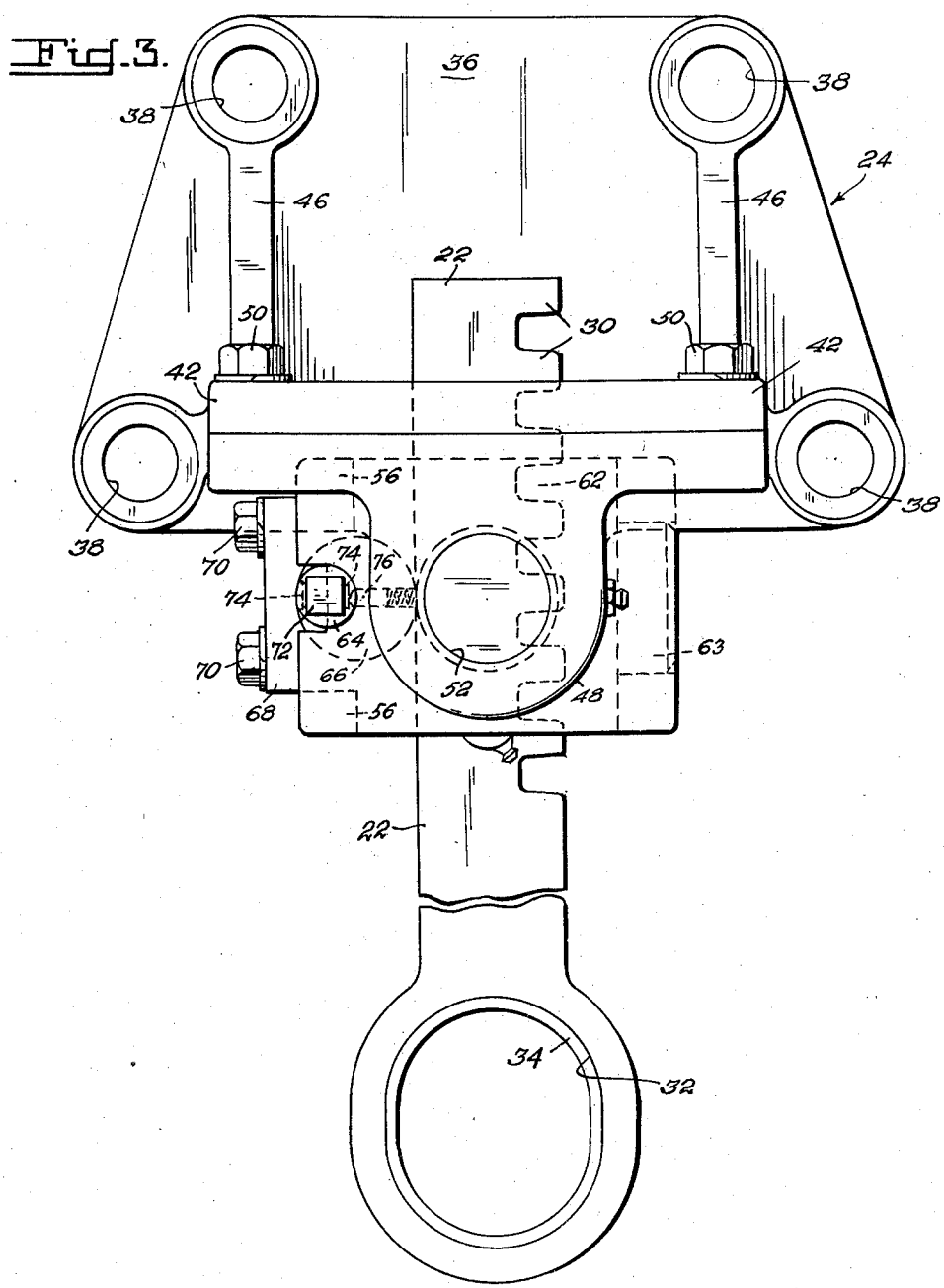

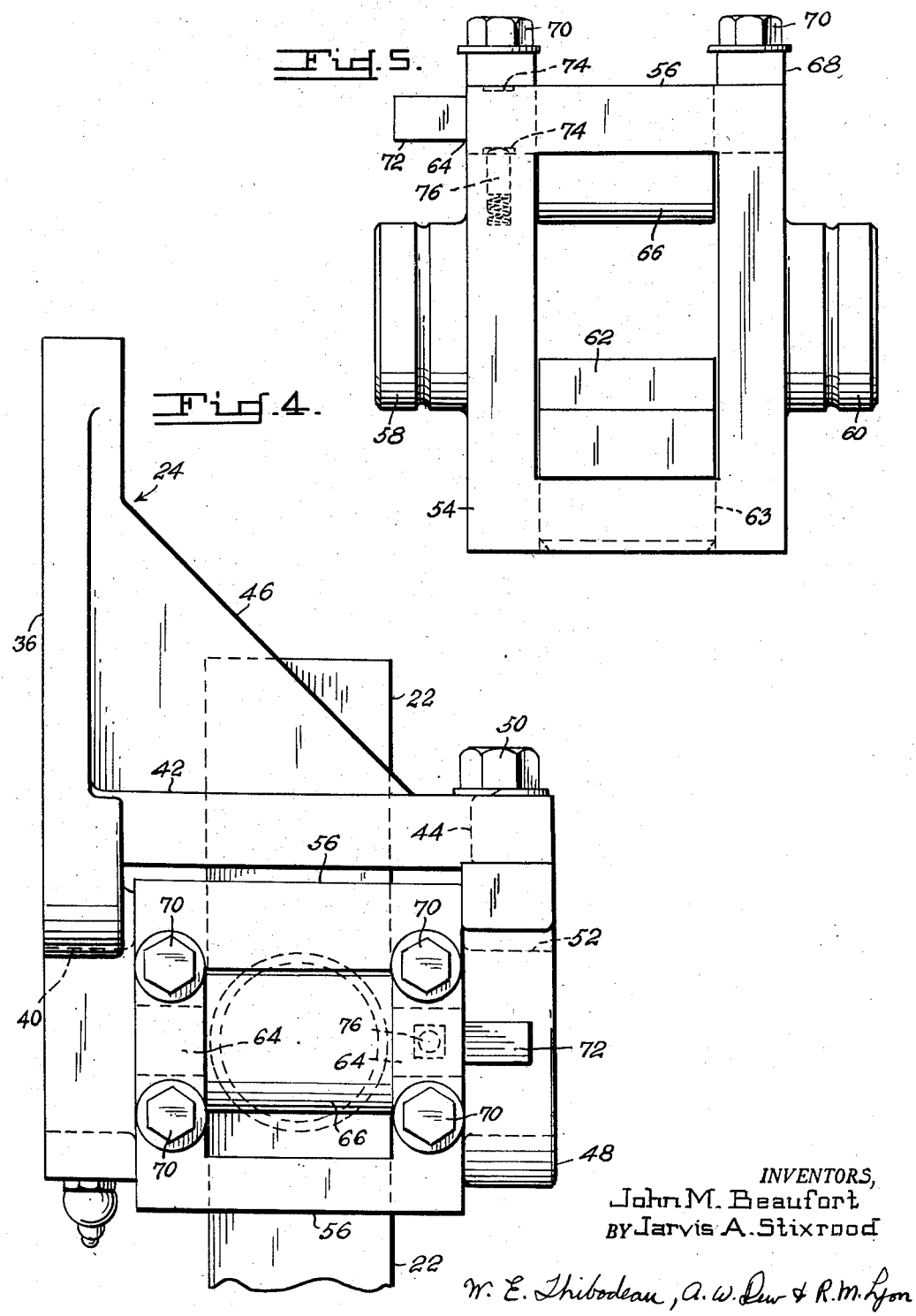

United States Patent Office 2,859,045
Patented Nov. 4, 1958

2,859,045

VEHICLE SUSPENSION LOCK

John M. Beaufort and Jarvis A. Stixrood,
Mercer Island, Wash.

Application December 28, 1956, Serial No. 631,385

2 Claims. (Cl. 280—6)

The invention relates to a lock-out device for vehicle suspension systems, particularly to a lock-out device for use with heavy vehicles.

In the construction of self-propelled cranes, dredges, power shovels, wreckers and other vehicles on which booms and derricks are mounted, the problem of supporting the vehicle presents difficulties due to differences in the performance characteristics desired during the various stages of vehicle operation. For instance, when the vehicle is traveling, it is desirable that the wheels or tracks be attached to the vehicle frame through a suspension system so as to absorb shocks caused by bumps, depressions and other irregularities in the terrain, thus preventing damage to the vehicle and providing a more comfortable ride for the operator.

Once the vehicle has arrived at the work site and the derrick is put into operation, the suspension system becomes a detriment because of the fact that the heavy, off-set loads which are imposed on the vehicle tend to overload the suspension system and cause the vehicle to tip, thus endangering the operator and decreasing the load capacity.

Several designs have been presented to overcome the above problem and include the concept of eliminating the suspension system entirely by mounting the vehicle supporting wheels directly to the frame. This construction is used on lower cost shovels and cranes, which are transported to the working location by other vehicles but has obvious disadvantages for higher speed machines. Another type of construction utilizes a set of jacks mounted on the vehicle frame which engage the ground during use of the boom or derrick, thus preventing tipping or movement as loads are imposed on the vehicle. This construction is expensive and seriously limits mobility as the jacks must be raised whenever the vehicle is moved. A third means of stabilizing the vehicle uses a lock-out device which is interposed between the wheels and vehicle frame, by-passing the suspension system, and therefore providing a rigid support for the derrick, yet may be disconnected when the vehicle is traveling to receive the advantages of a suspension system. It is to the latter type of device which the invention relates.

It is an object of the invention to produce an improved lock-out device for a vehicle suspension system which may be easily attached, and will rigidly fix the supporting wheels in relation to the vehicle, yet not affect mobility.

Another object of the invention is to design a suspension lock-out device which may be readily adapted to existing vehicles and may be used with vehicles of the track laying type.

A further object of the invention is to produce a suspension system lock-out which utilizes a rack type positive lock and employs a cam to insure engagement of the locking bar with the rack.

These and other objects of the invention will become apparent from the following description of the invention and included drawings wherein:

Fig. 1 is an elevational view of a vehicle suspension system employing the invention.

Fig. 2 is a cross-sectional view taken along the line II—II of Fig. 1.

Fig. 3 is an elevational view of the invention when assembled.

Fig. 4 is another assembled elevational view of the invention taken from the left of Fig. 3.

Fig. 5 is an elevational view of the trunnion assembly used in the invention.

The lock-out device of the invention may be used with either wheeled or tracked vehicles, however, for purposes of illustration the disclosed embodiment is shown for use with a track type vehicle.

As seen in Fig. 1, the invention may be used with the running gear of a tracked vehicle on which a boom, derrick or crane or other heavy equipment may be mounted. A track 10 is driven by a drive wheel, not shown, to operate the vehicle in the normal fashion. The track 10 is guided by a series of road wheels 12, idler wheel 14 and support roller 16, one of which is illustrated. The roadwheels, idler wheel and support roller are all of conventional construction and need not be of special design to utilize the invention. The road wheels 12 are rotatably mounted on arms 18 which are in turn pivotally supported in the vehicle frame and are connected to conventional suspension means such as torsion bars. A shock absorbing bumper 20 is located adjacent each road wheel arm 18 to limit the movement of the road wheel under extreme load and shock conditions; thus, the vehicle weight will be supported on road wheels 12 and the suspended arms 18.

In general, the suspension lock-out device consists of a lock bar 22, which is attached to the road wheel axle, and a bracket 24 fixed to the vehicle frame or hull. By locking bar 22 to bracket 24, the road wheels 12 will be incapable of vertical movement, thus preventing the road wheel suspension system from operating.

As seen in Fig. 2, the road wheel 12 is rotatably mounted on an axle 26 which is keyed to the supporting arm 18. The end of axle 26 is slightly reduced to form a projection 28 which will coact with the bumper 20 during normal operation of the vehicle.

When it is desired to lock out the suspension system, the lock bar 22 is slid onto the projection 28. As seen in Fig. 3, the lock bar 22 consists of an elongated member preferably of square or rectangular cross-section, one side of which is formed with a series of gear teeth 30 so as to form a rack. The other end of bar 22 is enlarged and provided with an elongated bore 32 which is lined with a bearing 34, the purpose for using an elongated bore will be explained later in the specification.

Figs. 3 and 4 best illustrate the bracket 24 which forms the second member of the lock-out device. Bracket 24 consists of a base 36 of a planar configuration in which are formed a series of holes 38, whereby the bracket 24 may be bolted to the frame of the vehicle in close proximity to each road wheel. A trunnion supporting hole 40 is also bored in base 36 for use as later described. A pair of supporting members 42 are formed integral with base 36 and extend outwardly at right angles thereto. A rib 44 connects the outer ends of members 42 and a pair of webs 46 extend from members 42 to base 36 for reinforcement purposes.

A trunnion support 48 is fastened to the members 42 by a pair of bolts 50 and is formed with a bore 52, such that the bores 40 and 52 are of the same size and have the same axis.

The bracket 24 serves as a support for the trunnion block which contains the structure for locking the bar 22. As seen in Fig. 5, the trunnion block 54 is rectangular shaped and is formed with solid sides and bottom; at the top the sides are connected by a pair of integral ribs 56. These ribs 56 are clearly shown in Figs. 3 and 4 which show the block 54 in position as used. A pair of trunnions 58 and 60 project from the sides of the trunnion block 54 and are machined with an oil groove. A gear rack 62 is fitted within block 54 and is maintained in position by a stud 63 which is press fitted into a hole in the bottom of the block 54 as shown in Fig. 5.

A cam shaft 64 is journaled in the other end of trunnion block 54 and includes a cam portion 66 located opposite to rack 62 and intermediate of the sides of the block. As shown in Fig. 3, the cam portion 66 has a cylindrical shape so that the cam engages the lock bar 22 in a tangential manner, on one line along its surface. Shaft 64 is journaled between the ribs 56 and is held in place by bearing caps 68 which are fastened by bolts 70. The projecting end 72 of the shaft 64 is formed with a square cross section, such that a wrench may be applied to rotate the cam 66. A pair of flats 74 are machined on shaft 64 diametrically opposite to each other and cooperate with a spring biased detent 76 within the trunnion block 54; thus, the cam 66 may be held in locked and unlocked position.

From Figs. 3 and 4 it will be apparent that the trunnion block 54 is pivotally mounted within bracket 24. The trunnion 60 is journaled within bore 40 and trunnion 58 is journaled within bore 52 of the support 48; thus, the trunnion block 54 will be fixed against vertical movement but is capable of pivotal action about a horizontal axis perpendicular to base 36 of bracket 24.

The lock-out device is used in the following manner:

When it is desired to use the crane, derrick or other heavy equipment mounted on the vehicle, the suspension system of road wheels 12 may be locked out by first attaching a wrench to the squared end 72 of the shaft 64 and rotating the shaft clockwise, as viewed in Fig. 3, such that the detent 76 will hold the cam 66 in unlocked position. The toothed end of lock bar 22 may then be inserted into the trunnion block between the cam 66 and gear rack 62 far enough to permit the bore 32 to be slipped over the projection 28 of the road wheel axle 26. As the bore 32 is of an oval configuration, there is enough "play" between bar 22 and projection 28 to permit the teeth 30 to align with the teeth of gear rack 62, the shaft 64 is then rotated counterclockwise bringing cam 66 into contact with the bar 22 and moving bar 22 such that the teeth 30 and teeth of gear rack 62 will mesh and be held in engagement by cam 66.

As the bracket 24 is fixed to the vehicle frame, the vertical movement of road wheels 12 will now be prevented, except for the slight "play" due to the oval bore 32, and the suspension will be effectively "locked-out" permitting the crane or derrick to lift larger loads with greater safety than if the lock-out device were not used.

To remove the device and restore the suspension system, the above operation is merely reversed by unlocking cam 66, sliding bar 22 off from projection 28 and withdrawing bar 22 from the trunnion block, thereby permitting the suspension system to support the vehicle weight.

The lock bar 22 is provided with teeth 30 along a substantial part of the length to permit use of the lock-out device, irrespective of the vertical position of the road wheel at the time the lock-out is put into operation. Also, by pivotally mounting the trunnion block 54 all the teeth of the gear rack 62 will mesh with those of the lock bar 22, irrespective of the position of the road wheel. The use of the lock-out device does not limit use of the vehicle as the operation of the road wheels are unhampered in respect to driving the vehicle.

If desired, a canvas or sheet metal cover may be snapped on to bracket 24 to protect against dirt and dust when the lock-out is not being used.

It is thus observed that the invention produces a suspension lock-out device which is easily installed on a vehicle providing a firm base for the equipment carried by the vehicle thereby increasing load capacity and safety. Though the invention is disclosed as used with a track type vehicle, use with a wheeled vehicle is within the scope of the invention and may be accomplished by attaching the lock bar to all weight supporting suspended wheels.

It will be understood that the invention is not limited to the disclosed embodiment and that various modifications may be apparent without departing from the spirit and scope of the invention, and it is intended the invention be limited only by the following claims.

We claim:

1. A lockout device for use with a suspended vehicle wheel comprising a bracket having a base, said base being fixed to the vehicle, a bore in said bracket having an axis perpendicular to said base, a support plate attached to said bracket, a bore in said plate having the same axis as said bore in said bracket, a block, a toothed rack fixed in said block, trunnions on said block, said trunnions mounted in said bores so that said block and thereby said rack can pivot about said axis, a rigid lock bar insertable in said block and connected to the axle of said vehicle wheel, a series of teeth on said lock bar located adjacent the stationary teeth of said rack and a rotatable shaft journaled in said block, said shaft having a circular cam portion adapted to engage said lock bar tangentially to hold the teeth of said lock bar in mesh with the teeth of said rack whereby said bar will limit vertical movement of said vehicle wheel.

2. A lockout device for use with a suspended vehicle wheel comprising a bracket fixed to the vehicle, a block pivotally mounted in said bracket, a toothed rack fixed in said block, a rigid lock bar insertable in said block and connected to the axle of said vehicle wheel, a series of teeth on said lock bar located adjacent the stationary teeth on said rack, a rotatable shaft journaled in said block, said shaft having a flat surface and a circular cam portion, said cam portion adapted to selectively engage said lock bar tangentially to hold the teeth of said bar in mesh with the teeth of said rack whereby said bar will limit vertical movement of said vehicle wheel, said flat surface facing said rack when said cam portion engages said bar, a bore in said block, a spring in said bore, and a detent in said bore, said spring forcing said detent against said flat surface so as to prevent rotation of said shaft and thereby said cam portion when said cam portion engages said lock bar.

References Cited in the file of this patent

UNITED STATES PATENTS

| | | |
|---|---|---|
| 1,532,884 | Chapin | Apr. 7, 1925 |
| 1,975,119 | Oates | Oct. 2, 1934 |
| 2,020,489 | Walker | Nov. 12, 1935 |
| 2,553,753 | Devor | May 22, 1951 |